(12) United States Patent
Guest

(10) Patent No.: US 6,183,022 B1
(45) Date of Patent: *Feb. 6, 2001

(54) TUBE COUPLING BODIES

(76) Inventor: John Derek Guest, 'Iona', Cannon Hill Way, Bray SL6 2EX, Maidenhead, Berkshire (GB)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/116,279

(22) Filed: Jul. 16, 1998

Related U.S. Application Data

(63) Continuation of application No. 09/116,279, filed on Jul. 16, 1998, which is a continuation-in-part of application No. 08/669,086, filed on Jun. 24, 1996, now Pat. No. 5,779,284, and a continuation of application No. 08/670,943, filed on Jun. 26, 1996, now abandoned.

(30) Foreign Application Priority Data

Jun. 26, 1995 (GB) .................................................. 9512974

(51) Int. Cl.⁷ .................................................. F16L 37/12
(52) U.S. Cl. .......................................... 285/322; 285/340
(58) Field of Search .................................... 285/104, 340, 285/322, 323, 423; 411/512, 508, 525, 526, 521

(56) References Cited

U.S. PATENT DOCUMENTS

| | | | |
|---|---|---|---|
| 2,712,262 | * 7/1955 | Knohl | 411/521 |
| 3,653,689 | 4/1972 | Sapy et al. | 285/113 |
| 3,743,326 | 7/1973 | Courtot et al. | 285/105 |
| 3,999,783 | 12/1976 | Legris | 285/24 |
| 4,606,783 | 8/1986 | Guest | 156/73.1 |
| 4,645,246 | 2/1987 | Guest | 285/323 |
| 4,676,530 | * 6/1987 | Nordgren | 285/340 |
| 4,712,810 | * 12/1987 | Pozzi | 285/340 |
| 4,722,560 | 2/1988 | Guest | 285/323 |
| 5,085,472 | 2/1992 | Guest | 285/158 |
| 5,171,045 | * 12/1992 | Pasbrig | 285/340 |
| 5,230,539 | 7/1993 | Olson | 285/323 |
| 5,603,532 | * 2/1997 | Guest | 285/340 |
| 5,779,284 | * 7/1998 | Guest | 285/340 |
| 5,799,985 | * 9/1998 | Murphy | 285/340 |

FOREIGN PATENT DOCUMENTS

| | | | |
|---|---|---|---|
| 2527023 | * 12/1976 | (DE) | 411/512 |
| 4234441 | * 4/1994 | (DE) | 285/340 |
| 2034841 | * 6/1980 | (GB) | 285/104 |

* cited by examiner

Primary Examiner—Eric K. Nicholson
(74) Attorney, Agent, or Firm—Baker & Daniels

(57) ABSTRACT

The disclosure relates to a tube coupling body having a throughway open at one end to receive a tube and an insert sleeve to fit in the throughway adjacent the open end with one end of the sleeve located within the throughway and the other end at the end open of the throughway. The insert sleeve has a tapered internal cam surface reducing towards said other end of the sleeve with which fingers of a tube gripping collet are engageable to receive and lock a tube inserted into the throughway in the coupling body. The external surface of the sleeve has an annular groove with a metal grab ring embedded in the sleeve adjacent the side of the groove nearest said one end of the sleeve and having multiple teeth around its outer periphery projecting radially beyond the outer surface of the sleeve on insertion of the sleeve in the throughway, the resilient teeth are angled towards said other end of the sleeve by engagement with the surface of the throughway, the angling of the fingers being accommodated by the annular groove and the resilience of the teeth causes the teeth to grip with the surface of the throughway to prevent the insert sleeve from being withdrawn from the throughway.

9 Claims, 3 Drawing Sheets

TUBE COUPLING BODIES

RELATED PRIOR APPLICATIONS

This is a Continued Prosecution of application Ser. No. 09/116,279, filed Jul. 16, 1998, which is a continuation-in-part of application Ser. No. 08/669,086, filed Jun. 24, 1996, now U.S. Pat. No. 5,779,284 and a continuation of application Ser. No. 08/670,943, filed Jun. 26, 1996 now abandoned.

BACKGROUND OF THE INVENTION

1. Field of the Invention

This invention relates to tube coupling bodies of the type in which an open ended throughway has a resilient fingered collet to receive and hold an end portion of a tube inserted into the throughway.

2. Background of Prior Art

My UK Patent Specification No 2,172,948 describes and illustrates a tap or valve body having a throughway to receive a tube which is locked in the throughway and is sealed to the bore by O-ring seals. The collet is encircled by an insert sleeve which is locked in the throughway by means of a collet having a plurality of resilient fingers. The collet is encircled by a plastics insert sleeve located in a counterbore at the end of the throughway and held therein by a spring ring embedded in the sleeve with an outwardly angled outer periphery to engage and grip the surface of the counterbore.

The angled outer periphery of the spring ring is almost entirely embedded in the insert sleeve which resists deflection of the ring as it is inserted into the counterbore. As a result, if the coupling body is formed on a soft plastics material, this is likely to be damaged on insertion of the sleeve reducing the effectiveness of the grip of the spring ring with the surface of the counterbore.

SUMMARY OF THE INVENTION

This invention provides a cylindrical attachment for locking in a bore the attachment having an external surface formed with an annular groove which has one side nearest one end of said attachment, and a metal grab ring embodied in the sleeve, said grab ring having multiple resilient fingers around an outer periphery of said ring projecting radially beyond the outer surface of the attachment and the ring being located adjacent said one side of said groove so that on insertion of the attachment into the throughway, the resilient fingers are flexed away from said one side of said groove and are thereby angled towards the other end of the attachment by engagement with a surface of the throughway, the flexing of the fingers being accommodated by the annular groove and the resilience of the fingers causing the fingers to grip said surface of the throughway to prevent attachment from being withdrawn from the throughway, the open end with one end of the sleeve located within the throughway and the other end at the end open of the throughway, the insert sleeve having a tapered internal cam surface reducing towards said other end of the sleeve with which fingers of a tube gripping collet are engageable to receive and lock a tube inserted into the throughway in the coupling body, the external surface of the sleeve having an annular groove and a metal grab ring embodied in the sleeve adjacent the side of the groove nearest said one end of the sleeve and having multiple fingers around its outer periphery projecting radially beyond the outer surface of the sleeve so that on insertion of the sleeve in the throughway, the resilient fingers are angled towards the other end of the sleeve by engagement with the surface of the throughway, the angling of the fingers being accommodated by the annular groove and the resilience of the fingers causing the fingers to grip with the surface of the throughway to prevent the insert sleeve from being withdrawn from the throughway.

The attachment may have an outwardly projecting encircling flange at said other end thereof which engages with the end face of the coupling body around the open end of the throughway to limit inserting of the sleeve into the throughway.

The attachment may have an external diameter corresponding to the internal diameter of the throughway and said annular groove is formed in the external surface of the attachment midway along the attachment.

DESCRIPTION OF THE PREFERRED EMBODIMENTS

Figure 1:
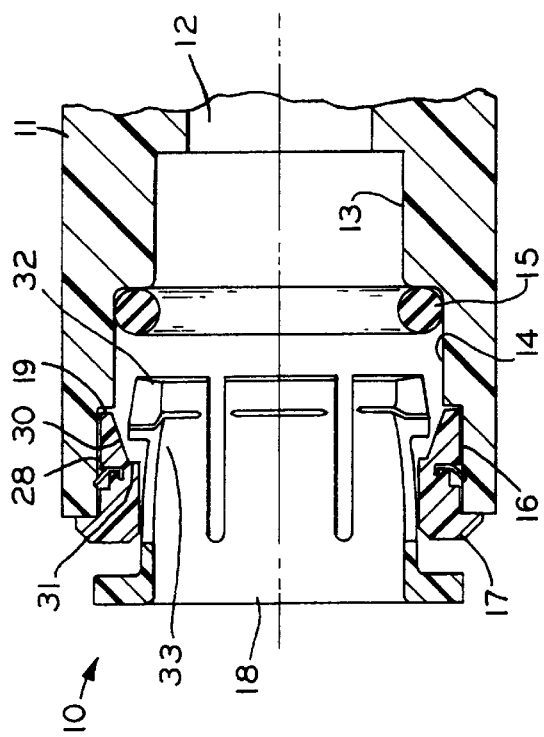
FIG. 1 is an assembly view of a tube coupling including coupling body having a throughway for receiving a tube and an insert sleeve mounted in the throughway which a collet is locatable for receiving and locking a tube in the throughway.

Referring firstly to FIG. 1 of the drawings, there is shown a tube coupling indicated generally at 10 and comprising a moulded plastics tube coupling body 11 having an open ended throughway 12 in which a tube end is engageable. Towards the open end of the throughway, the throughway is formed with a series of stepped counterbores comprising a first counterbore 13 providing an annular seat in which an end of a tube to be held in the coupling body is located, a second counterbore 14 in which an O ring seal 15 is mounted for sealing with the external surface of the tube and a third counterbore 16 at the open end of the throughway in which an insert sleeve 17 is mounted and in which a resilient fingered collet 18 is located to receive and grip the tube.

Figure 3:
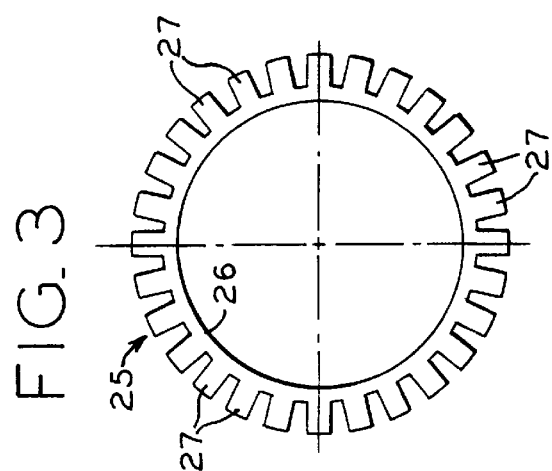
FIG. 3 is a end view of a grab ring embodied in the insert sleeve of the sleeve in the coupling body.
Figure 2:
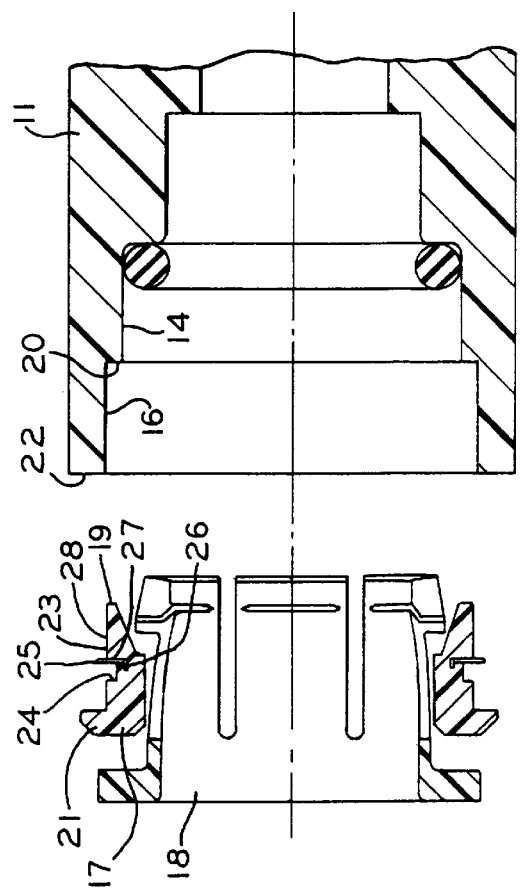
FIG. 2 is a similar to view to FIG. 1 showing insert sleeve and collet prior to insertion in the coupling body.

Reference is now made to FIG. 2 which illustrates the insert sleeve 17 and collet 18 prior to insertion in the counterbore 16 in the coupling body. To locate the sleeve, it is formed with out-turned flange 21 to engage the end face 22 of the coupling body 11. Between the end face 19 and flange 21, the insert sleeve has a cylindrical outer surface 23 which is a close fit in counterbore 16. Midway along the surface there is an annular rectangular section groove 24 and a grab ring 25 is embedded in the insert sleeve on the side of the groove 24 adjacent the side 28 of the groove nearest to end face 19 of the sleeve. The grab ring has a inner L-section annular portion 26 and a multiplicity of radial teeth 27 closely spaced around the annular portion. The grab ring is elevation in FIG. 3.

Prior to insertion of the insert sleeve 17 into the counterbore 16, the teeth 27 of the grab lie adjacent the side 28 of the groove nearest end 19 of the insert sleeve. On forcing the insert sleeve 17 into the counterbore 16, the teeth 25 are flexed by engagement with the surface of the counterbore away from the side 28 of the groove into the groove as shown in FIG. 1 and the resilience of the teeth holds the teeth firmly against the counterbore to resist extraction of the insert sleeve.

The inner side of the insert sleeve is formed with a tapered cam surface 30 extending from end 19 of the sleeve and terminating in an annular step 31 facing into the throughway. The tapered cam surface is engageable with heads 32 at the ends of resilient fingers 33 of the collet 18 to deflect the fingers inwardly as the collet is moved outwardly of the insert sleeve to cause the collet fingers to grip and engage a tube extending through the collet. The shoulder 31 at the reduced diameter end of the cam surface 30 provides a stop with which the head 32 are engageable when a tube is present in the collet to prevent inadvertent extraction of the collet from the coupling body.

In the above described embodiments a tube coupling body has an insert sleeve locked in the body by means of a grab ring embedded in a groove in the outer side of the sleeve. The following is a description of a number of embodiments in which similar grab ring arrangements are used to lock different components in bores in bodies. In each instance, the components of the grab ring and groove in which it is mounted are given the same reference numerals as hitherto.

Figure 4:
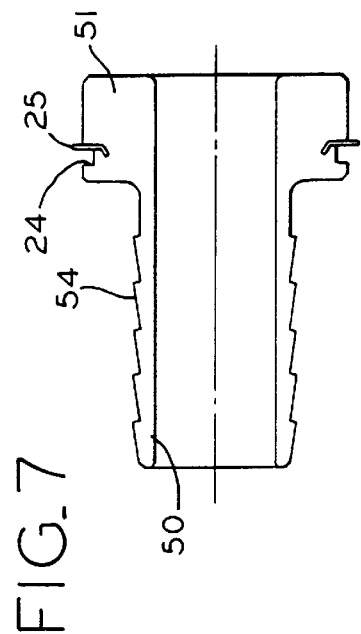
FIGS. 4 to 15 show further similar arrangements.

In the arrangement of FIG. 4, a plane tubular sleeve 50 has an enlarged annular head 51 at one end thereof. The head has an outer surface 52 in which the annular rectangular section groove 24 is formed with a grab ring 25 embodied in the head at one side of the groove. As before, the grab ring has an inner L-section annular portion to anchor the ring in the head and a multiplicity of radially spaced teeth 26 to engage the bore in the body in which the annular head is located to lock the bore in the head as described previously. The sleeve 50 can receive an end of a flexible tube or other component.

Figure 5:
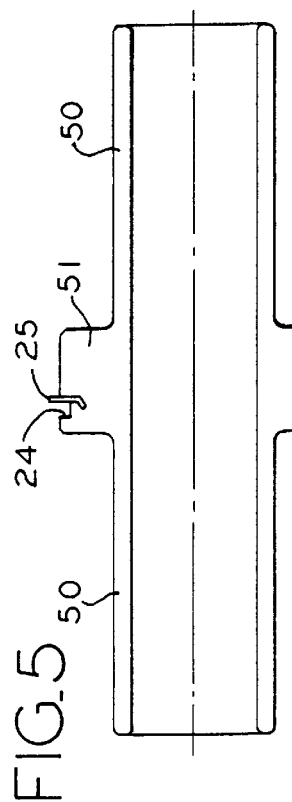

FIG. 5 of the drawings shows a similar arrangement to that of FIG. 4 except that the tube coupling is double ended having two projecting sleeves 50 with a central annular head 51 to lock in a bore in a body as described above.

Figure 6:
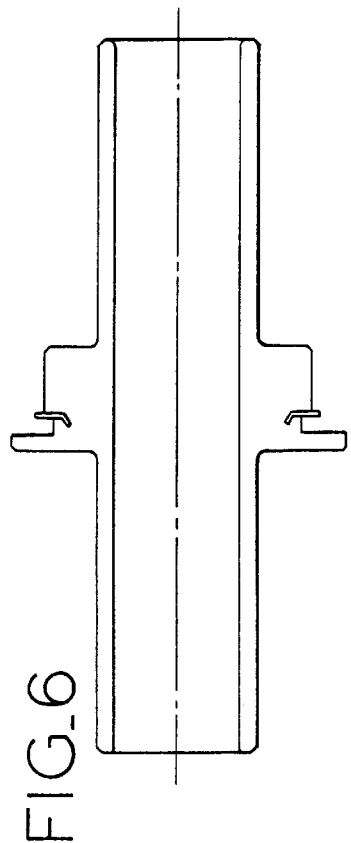

FIG. 6 shows a further variant in which one side of the head 51 has an outwardly projecting flange 53 to form a stop limiting insertion of the head into a bore.

Figure 7:
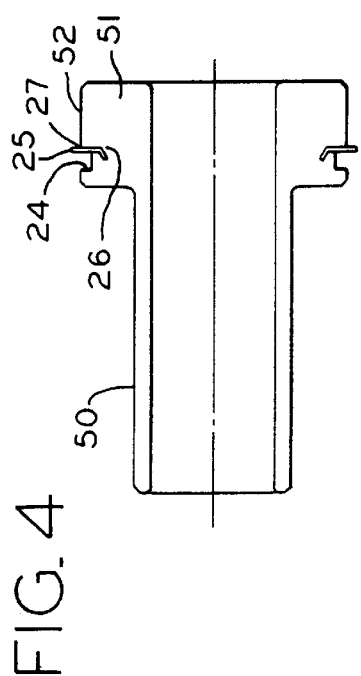

FIG. 7 shows a variant on the arrangement of FIG. 4 in which the external surface of the tube is formed with encircling ridges 54 to receive and grip a tube fitted over the sleeve.

Figure 8:
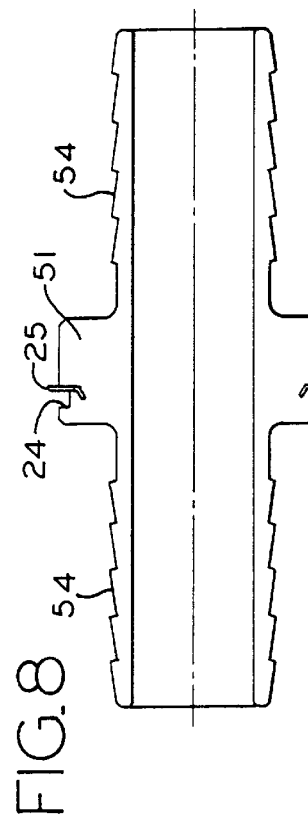

FIG. 8 show a double ended version of the coupling body of FIG. 7.

Figure 9:
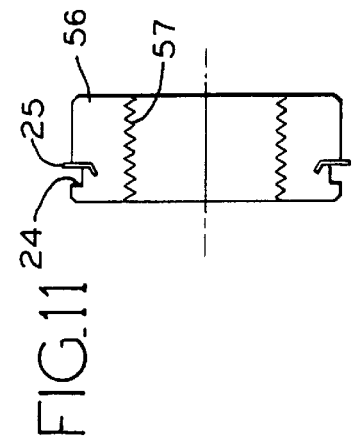

FIG. 9 shows a further variation in which a sleeve 50 has an external screw thread 51 to which a tube with a screw threaded fitting at the end thereof can be coupled.

Figure 10:
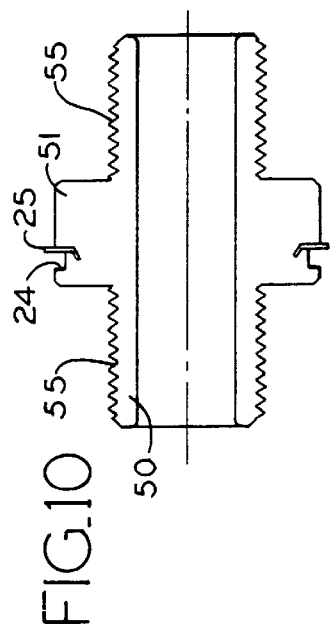

FIG. 10 shows a double ended version of the arrangement of FIG. 9.

Figure 11:
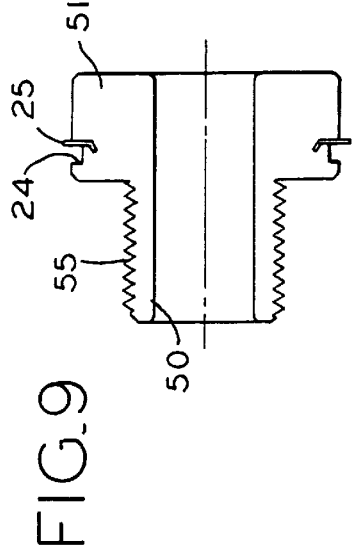

FIG. 11 shows an annular socket 56 having an external encircling groove 20 and grab ring 25 mounted in one side of the groove to lock the socket in a bore in a body. The socket has a plane bore or an internal screw thread 57 as shown.

Figure 12:
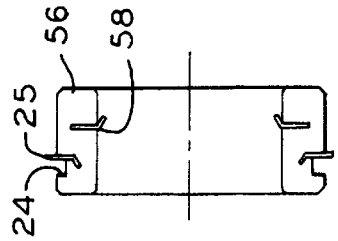

FIG. 12 shows a variation in which the socket 56 has an internal grab ring 58 to receive and lock a tube in the socket.

Figure 13:
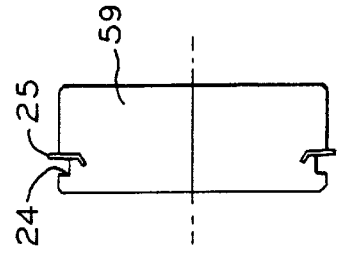

FIG. 13 shows a further variation in the form of a solid plug 59.

Figure 14:
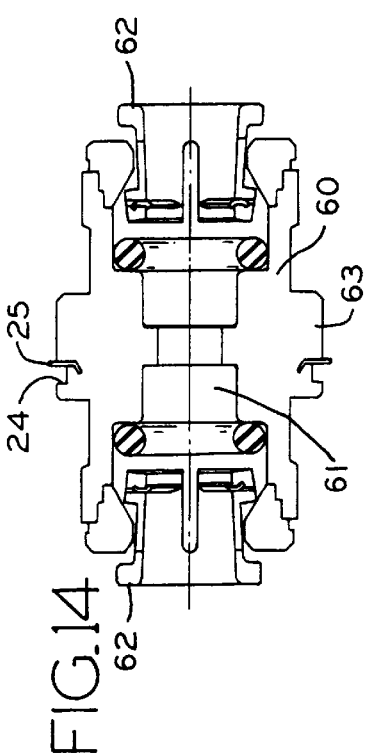

FIG. 14 shows a tube coupling body 60 having a throughway 61 open at both ends in which tube gripping collets 62 are mounted to receive and lock ends of tubes in the end of the coupling body. At the centre of the coupling body there is an enlarged head 63 having a rectangular groove 24 and grab ring 25 as described above for locking the coupling body the a bore in a component.

Figure 15:
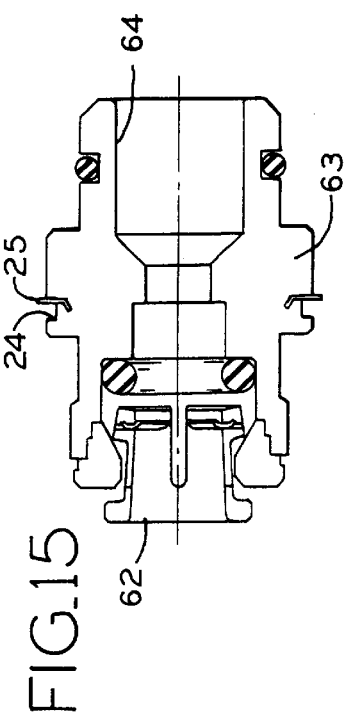

FIG. 15 shows a variation on the coupling body of FIG. 14 in which one end only of the coupling body has a collet 62 to receive and lock a tube therein, the other end having a plane bore 64 which may receive a further component.

What is claimed is:

1. A cylindrical attachment for locking in a bore, the attachment having an external surface formed with an annular groove which has one side nearest one end of said attachment, and a metal grab ring in the attachment, said grab ring having multiple resilient fingers around an outer periphery of said ring projecting radially beyond the external surface of the attachment, said resilient fingers lying substantially in a plane, the ring being located adjacent said one side of said groove so that on insertion of the attachment into a throughway, the resilient fingers are flexed and spaced away from said one side of said groove and are thereby moved out of said plane and angled towards the other end of the attachment by engagement with a surface of the throughway, the flexing of the fingers being accommodated by the annular groove and the resilience of the fingers causing the fingers to grip a surface of the throughway to prevent the attachment from being withdrawn from the throughway.

2. A cylindrical attachment as claimed in claim 1, wherein the attachment comprises an annular socket to engage in a hole in a body.

3. A cylindrical attachment as claimed in claim 2, wherein the socket has an integral projecting sleeve extending on at least one side thereof.

4. A cylindrical attachment as claimed in claim 3, wherein the sleeve extends on both sides of the socket.

5. A cylindrical attachment as claimed in claim 4, wherein the sleeve has plane inner and outer surfaces extending on both sides of the socket.

6. A cylindrical attachment as claimed in claim 5, wherein the socket comprises a coupling body of a tube coupling at least one end of which is open to receive a tube and has a collet device for receiving and locking a tube in the open end of the coupling body.

7. A cylindrical attachment as claimed in claim 6, wherein the coupling body is open at both ends and has collet devices at both ends for receiving and locking tubes in the coupling body.

8. A tube coupling as claimed in claim 6, wherein the coupling body has a plane bore at the opposite end thereof to the tube locking device.

9. A cylindrical attachment as claimed in claim 5, wherein the socket is formed with an encircling flange at one end to act as a stop to limit insertion of the socket into a bore.

* * * * *